United States Patent
Tezaur

(10) Patent No.: US 8,582,914 B2
(45) Date of Patent: Nov. 12, 2013

(54) TONE MAPPING WITH ADAPTIVE SLOPE FOR IMAGE SHARPENING

(75) Inventor: Radka Tezaur, Fremont, CA (US)

(73) Assignee: Nikon Corporation, Tokyo (JP)

( * ) Notice: Subject to any disclaimer, the term of this patent is extended or adjusted under 35 U.S.C. 154(b) by 7 days.

(21) Appl. No.: 13/522,668

(22) PCT Filed: Jul. 28, 2010

(86) PCT No.: PCT/US2010/043501
§ 371 (c)(1),
(2), (4) Date: Jul. 17, 2012

(87) PCT Pub. No.: WO2011/119178
PCT Pub. Date: Sep. 29, 2011

(65) Prior Publication Data
US 2012/0308154 A1 Dec. 6, 2012

Related U.S. Application Data

(60) Provisional application No. 61/316,111, filed on Mar. 22, 2010.

(51) Int. Cl.
*G06K 9/40* (2006.01)
(52) U.S. Cl.
USPC ............ 382/263; 382/254; 382/255; 382/274
(58) Field of Classification Search
USPC .......... 382/254, 255, 263, 274; 348/241, 606; 355/52, 77; 430/30; 358/3.27, 1.9; 345/600, 601; 716/50
See application file for complete search history.

(56) References Cited

U.S. PATENT DOCUMENTS 6,600,832 B1 7/2003 Nakayama
7,068,852 B2 6/2006 Braica
(Continued)

FOREIGN PATENT DOCUMENTS

WO 2009/146297 12/2009
WO 2011/119178 9/2011

OTHER PUBLICATIONS

International Search Report and Written Opinion for PCT/US2010/043501, ISA: US, Sep. 23, 2010, Nikon Corporation.

(Continued)

*Primary Examiner* — Anh Do
(74) *Attorney, Agent, or Firm* — Roeder & Broder LLP

(57) ABSTRACT

A method for sharpening a captured image (14) includes (i) selecting a pixel (240) in the captured image (14); (ii) selecting a selected high intensity value (302); (iii) selecting a selected low intensity value (302); (iv) normalizing the intensity value to establish a normalized intensity value using the selected high intensity value and the selected low intensity value (304); (v) determining an adjusted normalized intensity value for the normalized intensity value using a contrast correction function (306); and (vi) scaling the adjusted normalized intensity value to get a transformed intensity value (308). Subsequently, the adjusted image (16) can be generated using the transformed intensity value for each pixel (240). The contrast correction function can be selected that provides the desired amount of sharpening. Thus, the amount of sharpening that is applied to the image (14) can be specifically selected.

18 Claims, 4 Drawing Sheets

(56) References Cited

U.S. PATENT DOCUMENTS

| | | | | |
|---|---|---|---|---|
| 7,853,096 | B1 * | 12/2010 | Wilensky | 382/274 |
| 7,860,339 | B2 * | 12/2010 | Yamashita et al. | 382/274 |
| 8,165,417 | B2 * | 4/2012 | Yamashita et al. | 382/274 |
| 8,228,560 | B2 * | 7/2012 | Hooper | 358/3.27 |
| 8,260,080 | B1 * | 9/2012 | Wilensky | 382/274 |
| 8,456,545 | B2 * | 6/2013 | Chan et al. | 348/241 |
| 2007/0041636 | A1 | 2/2007 | Yoon | |

OTHER PUBLICATIONS

Safanov, Ilia V. et al, Adaptive Sharpening of Photos, SPIE-IS&T Electronic Imaging 2008, SPIE vol. 7807, Proc. of SPIE-IS&T Electronic Imaging, © 2008 SPIE-IS&T.

* cited by examiner

| Normalized Intensity Value | Adjusted Intensity Value (a=1.2) | Adjusted Intensity Value (a=1.4) | Adjusted Intensity Value (a=1.6) |
|---|---|---|---|
| 0.2 | 0.167 | 0.139 | 0.115 |
| 0.4 | 0.383 | 0.366 | 0.35 |
| 0.6 | 0.617 | 0.634 | 0.65 |
| 0.8 | 0.833 | 0.861 | 0.885 |

TONE MAPPING WITH ADAPTIVE SLOPE FOR IMAGE SHARPENING

BACKGROUND

Cameras are commonly used to capture an image of a scene that includes one or more objects. Unfortunately, some of the images are blurred. For example, movement of the camera, and/or movement of the objects in the scene during the exposure time of the camera can cause the image to be blurred. Further, an out of focus image is also blurred.

Currently, there are some post processing, digital image processing software applications that are used to increase that sharpness of blurred images. One common type of sharpening software includes a tone mapping step that helps to reduce the width of edges in a digital image. Unfortunately, existing tone mapping algorithms are not completely satisfactory because the adjusted image looks posterized.

SUMMARY

The present invention is directed to an image apparatus and method for sharpening a captured image using a processor to perform the steps of (i) identifying a first pixel having a first intensity value in the captured image, the first pixel including a plurality of first neighboring pixels that are positioned in a predetermined first pixel window; (ii) selecting a first selected high intensity value for the first pixel window; (iii) selecting a first selected low intensity value for the first pixel window; (iv) normalizing the first intensity value to establish a first normalized intensity value using the selected high intensity value and the selected low intensity value; (v) selecting between one of a first contrast correction function providing a first level of sharpening and a second contrast correction function providing a second level of sharpening that is different from the first level of sharpening, the first contrast correction function having a first slope in a middle and the second contrast correction function having a second slope in a middle that is different than the first slope; (vi) determining a first adjusted normalized intensity value for the first normalized intensity value using the selected contrast correction function; and (v) scaling the first adjusted normalized intensity value to get a first transformed intensity value. Subsequently, the adjusted image can be generated using the first transformed intensity value.

As an overview, in certain embodiments, with this design, the contrast correction function can be selected that provides the desired amount of sharpening. Thus, the amount of sharpening that is applied to the image can be specifically selected. As a result thereof, the corrected image can look less posterized and is more visually pleasing.

Moreover, in certain embodiments, the amount of sharpening that is applied to the pixels in the image can vary throughout the image. As provided herein, tone mapping works well mainly for sharpening step-like edges and therefore it might be desirable to (i) apply more sharpening by tone mapping (i.e., contrast curve with steeper slope) to pixels that lie at or near step-like edge, and (ii) less sharpening by tone mapping (i.e. contrast curve with a less steep slope) to pixels that are in smooth areas or that lie at or in the vicinity of fine lines and other small details.

In certain non-exclusive embodiments, each contrast correction function can have a slope in a middle that is less than two. In a more specific example, each contrast correction function has a slope in a middle that is between approximately 1 and 1.6. As a result thereof, the corrected image can look less posterized and is more visually pleasing. It should be noted that these are mere examples of values that work well for high resolution photorealistic images and for viewing conditions such as a computer screen, at 100% magnification. However, the slope can be different than the examples provided herein.

In one non-exclusive embodiment, each contrast correction function can be expressed as (i) $g_a(x)=2^{a-1} x^a$, if $0 \leq x \leq \frac{1}{2}$, or as (ii) $g_a(x)=1-2^{a-1} (1-x)^a$ if $\frac{1}{2} \leq x \leq 1$. In these equations, the term "$g_a(x)$" represents the adjusted normalized intensity value, the term "a" represents a parameter that controls a steepness of the respective contrast correction function, and the term "x" represents the normalized intensity value. In non-exclusive embodiments, the parameter "a" can have a value of between approximately 1 and 1.6. It should be noted that the particular formula for $g_a(x)$ described above is merely an example, as it is relatively easy to come up with other formulas that result in the desired curves.

As provided herein, each contrast correction function can be expressed as a separate curve in a graph that plots normalized intensity values versus adjusted normalized intensity values. In another embodiment, each contrast correction function can be expressed in a look-up table that correlates the relationship between a plurality of normalized intensity values and a plurality of adjusted normalized intensity values.

The present invention is also directed to a method for sharpening a captured image that includes the steps of processing a first pixel and a second pixel in the captured image. In this embodiment, the step of processing the first pixel includes the steps of (i) identifying a first intensity value for the first pixel; (ii) selecting a first selected high intensity value for the first pixel window; (iii) selecting a first selected low intensity value for the first pixel window; (iv) normalizing the first intensity value to establish a first normalized intensity value using the selected high intensity value and the selected low intensity value; (v) determining a first adjusted normalized intensity value for the first normalized intensity value using a first contrast correction function having a first slope in a middle; and (vi) scaling the first adjusted normalized intensity value to get a first transformed intensity value. Further, the step of processing the second pixel includes the steps of (i) identifying a second intensity value for the second pixel; (ii) selecting a second selected high intensity value for the second pixel window; (iii) selecting a second selected low intensity value for the second pixel window; (iv) normalizing the second intensity value to establish a second normalized intensity value; (v) determining a second adjusted normalized intensity value for the second normalized intensity value using a second contrast correction function having a second slope in a middle that is different than the first slope; and (vi) scaling the second adjusted normalized intensity value to get a second transformed intensity value. In this embodiment, the adjusted image can be generated using the first transformed intensity value and the second transformed intensity value.

With this embodiment, different pixels in the same image are tone mapped with a different level of contrast adjustment. Stated in another fashion, tone mapping of the captured image is performed with an adaptive slope of the contrast correction function. As a result thereof, the adjusted image is more visually pleasing.

Further, as provided herein, a third pixel in the captured image can be processed by (i) identifying a third intensity value for the third pixel; (ii) selecting a third selected high intensity value for the third pixel window; (iii) selecting a third selected low intensity value for the third pixel window; (iv) normalizing the third intensity value to establish a third normalized intensity value; (v) determining a third adjusted normalized intensity value for the third normalized intensity value using a third contrast correction function having a third slope in a middle that is different than the first slope and the second slope; and (vi) scaling the third adjusted normalized intensity value to get a third transformed intensity value.

Additionally, the present invention discloses, that the pixels of the captured image are evaluated to identify step-like edge pixels, line edge pixels, and smooth pixels. In one embodiment, (i) the step-like edge pixels are processed similar to the first pixel, (ii) the line edge pixels are processed similar to the second pixel, and (iii) the smooth pixels are processed similar to the third pixel.

DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
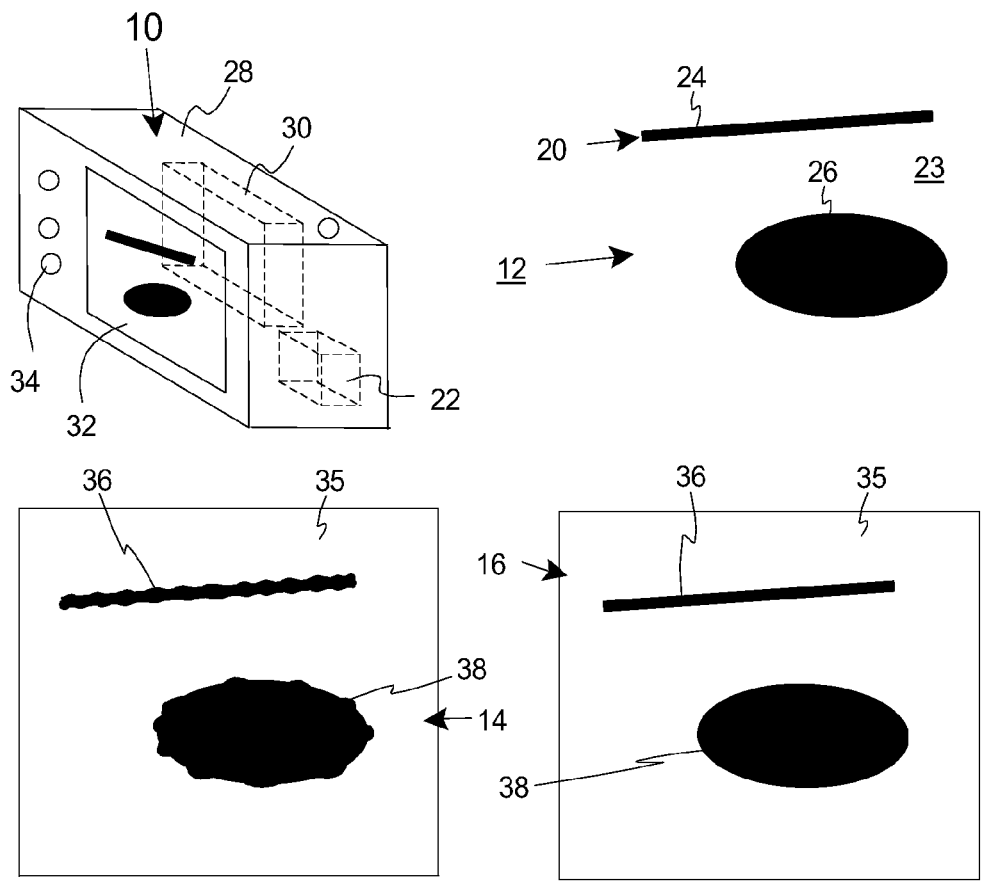
FIG. 1 is a simplified view of a scene, an image apparatus having features of the present invention, a captured image of the scene, and an adjusted image.

FIG. 1 is a simplified perspective illustration of an image apparatus 10 having features of the present invention, and a simplified illustration of a scene 12. FIG. 1 also illustrates a raw captured image 14 (illustrated away from the image apparatus 10) captured by the image apparatus 10, and an adjusted image 16 (illustrated away from the image apparatus 10) generated by the image apparatus 10. In FIG. 1, the raw captured image 14 is blurred 18 (illustrated as a wavy line). For example, movement of the image apparatus 10, and/or movement of one or more objects 20 in the scene 12 during the capturing of the image 14 can cause motion blur 18. Alternatively or additionally, for example, blur 18 in the captured image 14 can be caused by the image apparatus 10 not being properly focused when the image 14 is captured.

In one embodiment, the image apparatus 10 includes a control system 22 (illustrated as a box in phantom) that uses a unique program that utilizes tone mapping with adaptive slope for image sharpening the captured image 14 to provide the adjusted image 16. Stated in another fashion, in one embodiment, the control system 22 provides in camera sharpening of the raw image 14 to provide the more visually pleasing, sharpened adjusted image 16. Alternatively, the sharpening program provided herein can be utilized by a computer to post-process the blurred captured images 14.

The type of scene 12 captured by the image apparatus 10 can vary. For example, the scene 12 can include one or more objects 20, e.g. animals, plants, mammals, structures, and/or environments. For simplicity, in FIG. 1, the scene 12 is illustrated as including a white background 23, a solid black, thin rectangle 24 and a solid black oval 26.

In one embodiment, the image apparatus 10 is a digital camera, and includes an apparatus frame 28, and a capturing system 30 (illustrated as a box in phantom), in addition to the control system 22. It should be noted that many of the necessary components of the image apparatus 10 have been omitted for clarity. Additionally or alternatively, the image apparatus 10 can be designed to capture a video of the scene 12.

The apparatus frame 28 can be rigid and support at least some of the other components of the image apparatus 10. In one embodiment, the apparatus frame 28 includes a generally rectangular shaped hollow body that forms a cavity that receives and retains at least some of the other components of the camera.

The capturing system 30 captures information for the raw captured image 14. The design of the capturing system 30 can vary according to the type of image apparatus 10. For a digital type camera, the capturing system 30 can include an image sensor (not shown), and a storage system (not shown). The image sensor receives the light and converts the light into electricity. One non-exclusive example of an image sensor for digital cameras is known as a charge coupled device ("CCD"). An alternative image sensor uses complementary metal oxide semiconductor ("CMOS") technology. The storage system stores the various captured and/or adjusted images 14, 16 before these images are ultimately printed out, deleted, transferred or downloaded to an auxiliary storage system or a printer. The storage system can be fixedly or removable coupled to the apparatus frame 28. Non-exclusive examples of suitable storage systems include flash memory, a floppy disk, a hard disk, or a writeable CD or DVD.

The control system 22 is electrically connected to and controls the operation of the electrical components of the image apparatus 10. The control system 22 can include one or more processors, and the control system 22 can be programmed to perform one or more of the functions described herein. In FIG. 1, the control system 22 is secured to and is positioned within the apparatus frame 28 and the rest of the components of the image apparatus 10. As provided above, the control system 22 can include software that reduces the level of blur 18 in the blurred captured image 14 to provide the sharpened adjusted image 16.

The image apparatus 10 can include an image display 32 that displays the captured images 14, the adjusted images 16, and/or other information that can be used to control the functions of the image apparatus 10. With this design, the user can decide which images 14, 16 should be stored and which images 14, 16 should be deleted. In FIG. 1, the image display 32 is fixedly mounted to the rest of the image apparatus 10. Alternatively, the image display 32 can be secured with a hinge mounting system (not shown) that enables the display 32 to be pivoted.

Moreover, the image apparatus 10 can include one or more control switches 34 electrically connected to the control system 22 that allows the user to control the functions of the image apparatus 10. For example, one or more of the control switches 34 can be used to selectively switch the image apparatus 10 to activate the sharpening and blur reduction processes disclosed herein.

In FIG. 1, the captured image 14 and the adjusted image 16 each includes (i) a background image part 35 that represents the captured background 23 of the scene 12, (ii) a rectangle image part 36 that represents the captured rectangle 24 of the scene 12, and (iii) an oval image part 38 that represents the captured oval 26 of the scene 12. In FIG. 1, the edges of the rectangle image part 36 and the edges of the oval image part 38 of the captured image 14 are blurred 18. Further, the control system 22 sharpens the captured image 14 to provide the adjusted image 16 that has sharper edges of the rectangle image part 36 and shaper edges of the oval image part 38.

Figure 2:
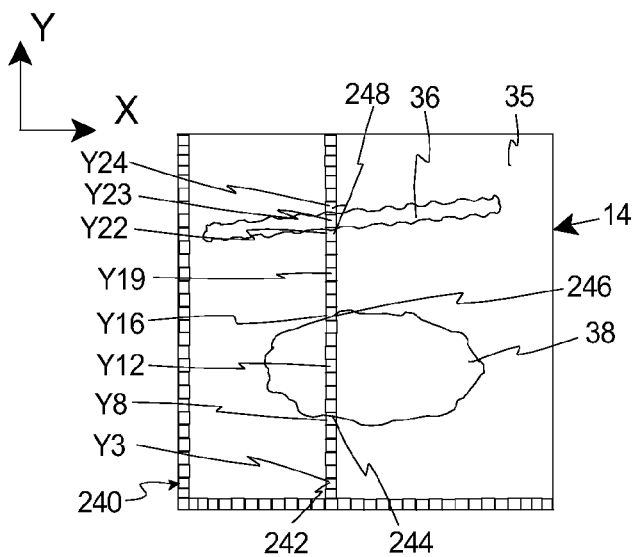
FIG. 2 is a simplified view of the captured image of FIG. 1.

FIG. 2 illustrates the captured image 14 of FIG. 1, including the background image part 35, the rectangle image part 36, and the oval image part 38. However, in FIG. 2, the rectangle image part 36 and the oval image part 38 are illustrated in line format instead of as solid objects for clarity of illustration. Additionally, FIG. 2 illustrates that the captured image 14 is comprised of a plurality of pixels 240 (only a few representative pixels are illustrated in FIG. 2). This Figure also includes a two-dimensional orientation system that illustrates an X axis, and a Y axis for the captured image 14. In this example, each of the pixels 240 is labeled relative to this coordinate system. For example, the bottom left corner pixel can be indentified as (X1, Y1) that represents the pixel in the first column and the first row. Further, in this example, the captured image 14 is illustrated as a thirty by thirty pixel array for simplicity. However, a typical captured image 14 will be comprised of millions of pixels.

As provided herein, the pixels 240 of the captured image 14 can be characterized based on the texture of the areas that they capture. For example, the captured image 14 can include (i) one or more scene smooth regions, e.g. areas which have a substantially constant color (color homogenous regions); and/or (ii) one or more scene edge regions, e.g. areas which are in the transition between objects, lines, and color changes. In this embodiment, the pixels 240 that are part of the smooth regions of the captured image 14 can be labeled as smooth pixels 242 (also sometimes referred to as "non-edge pixels"); and the pixels that are part of the edge regions can be labeled as edge pixels 244. As provided herein, the term edge pixel 244 is defined as those pixels on or within a prescribed distance of (e.g., up to 5 or 10 pixels away) an edge captured in the image 14.

In FIG. 2, (i) some of the pixels 240 that have captured the background 23 (illustrated in FIG. 1), and some of the pixels 240 that have captured the oval 26 (illustrated in FIG. 1) are smooth pixels 242; and (ii) the pixels 240 that have captured the transition between the background 23 and the rectangle 24, and the pixels 240 that have captured the transition between the background 23 and the oval 26 are edge pixels 244.

As an example, in column 13, (X13) of FIG. 2 (i) the pixel at row 3 (Y3) is a smooth pixel 242 that has captured a portion of the background 23; (ii) the pixel at row 8 (Y8) is an edge pixel 244 that has captured a portion of the edge between the background 23 and the oval 26; (iii) the pixel at row 12 (Y12) is a smooth pixel 242 that has captured a portion of the oval 26; (iv) the pixel at row 16 (Y16) is an edge pixel 244 that has captured a portion of the edge between the background 23 and the oval 26; (v) the pixel at row 19 (Y19) is a smooth pixel 242 that has captured a portion of the background 23; (vii) the pixel at row 22 (Y22) is an edge pixel 244 that has captured a portion of the edge between the background 23 and the rectangle 24; and (ix) the pixel at row 24 (Y24) is an edge pixel 244 that has captured a portion of the edge between the background 23 and the rectangle 24.

As provided above, in certain embodiments, the present invention teaches that different levels of contrast control is necessary during the sharpening of different types of pixels 240. Stated in another fashion, different pixels in a blurred image require a different level of contrast correction to properly restore the image. In certain embodiments, the present invention classifies each of the pixels 240 in the captured image 14 as (i) a smooth pixel 242, (ii) a step-like edge pixel 246, or (iii) a line edge pixel 248. In one embodiment, (i) the edge pixels 244 that are part of a line-like edge in the captured image 14 are considered line edge pixels 248, and (ii) the remaining edge pixels in the captured image 14 are considered step-like edge pixels 246. In this example, step-like pixels 246 include edge pixels 244 that are part of a step-like edge between two objects.

For example, in certain embodiments, the step-like edge pixels 246 can be subjected to tone mapping using a first contrast correction function; while the smooth pixels 242 and the line edge pixels 248 can be subjected to tone mapping using a second contrast correction function that is different than the first contrast correction function. Thus, in certain embodiments, different pixels 240 in a blurred image need a different type and/or level of contrast correction to properly restore local contrast.

In another embodiment, the step-like edge pixels 246 can be subjected to tone mapping using the first contrast correction function; the smooth pixels 242 can be subjected to tone mapping using the second contrast correction function that is different than the first contrast correction function; and the line-like edge pixels 248 can be subjected to tone mapping using a third contrast correction function that is different than the first and second contrast correction functions.

In certain designs, the area where strong contrast correction is not desirable is the area between such line edges because these edges should be restored with other sharpening methods, such as using an unsharp mask with limited overshoot control.

Figure 3:
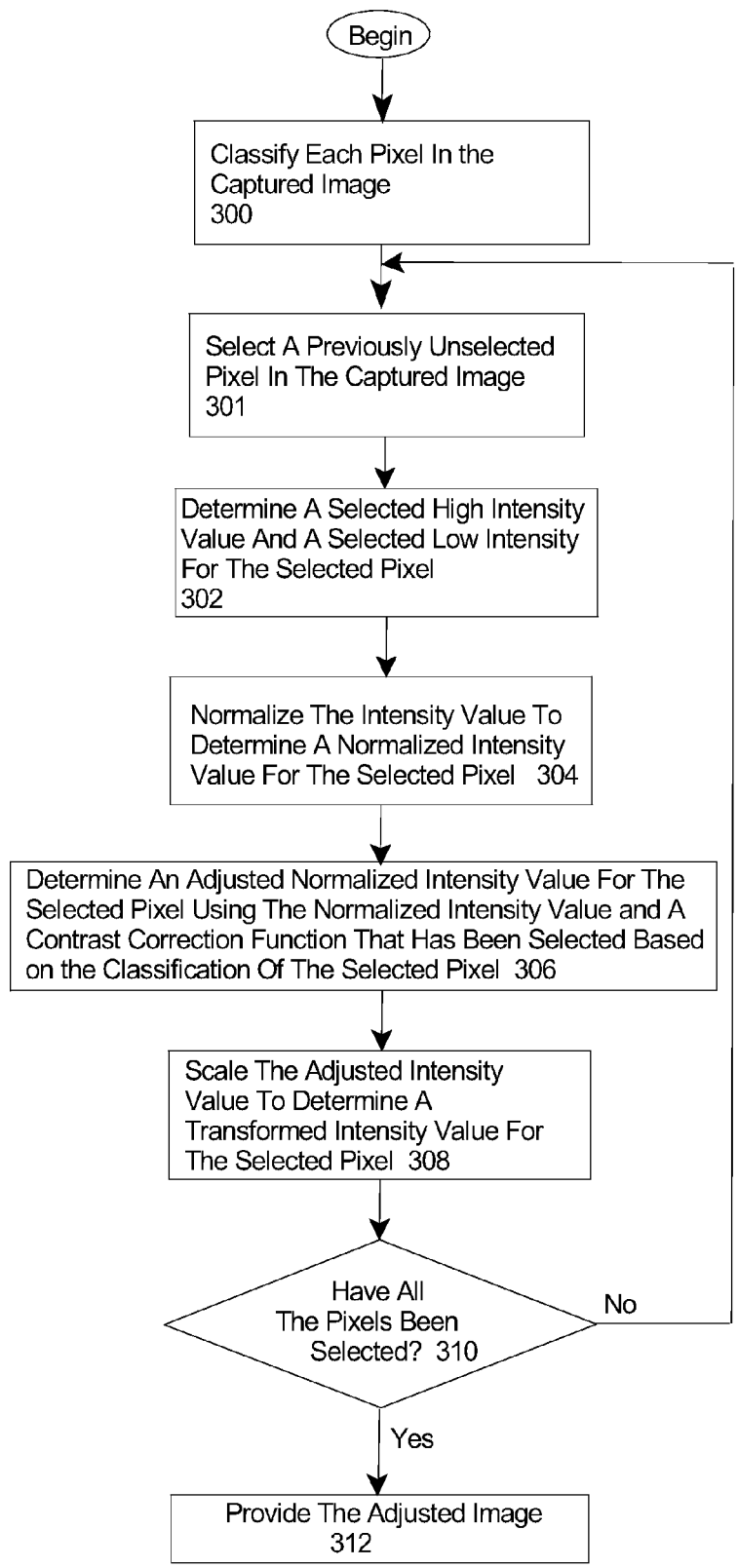
FIG. 3 is a flow chart that illustrates one embodiment of a sharpening method having features of the present invention.

FIG. 3 is a flow chart that illustrates one non-exclusive embodiment of the steps performed by the control system 22 (illustrated in FIG. 1) to sharpen the captured image 14 (illustrated in FIG. 2) using tone mapping. In FIG. 3, (i) at step 300, the control system 22 classifies each of the pixels in the captured image; (ii) at step 301, the control system 22 selects a previously unselected pixel in the captured image 14; (iii) subsequently, at step 302, the control system 22 determines a selected high intensity value and a selected low intensity value for a pixel window of the selected pixel; (iv) next, at step 304, the control system normalizes an original intensity value for the selected pixel to establish a normalized intensity value for the selected pixel; (v) subsequently, at step 306, the control system determines an adjusted normalized intensity value for the selected pixel using the normalized intensity value and a contrast correction function that was selected (e.g. based on the classification of the pixel) for the selected pixel; (vi) next, at step 308, the control system scales the adjusted normalized intensity value to get a transformed intensity value for the selected pixel; (vii) subsequently, this process is repeated at step 310 until all of the pixels of the captured image have been selected; and (viii) finally, at step 312, the captured image is sharpened using the transformed intensity value for each pixel to provide the adjusted image. Steps 300-308 are described in more detail below.

As provided above, at step 300, the control system 22 reviews all of the pixels 240 of the captured image 14 and classifies all of the pixels 240 in the captured image 14. As a non-exclusive embodiment, the control system 22 can evaluate and classify each pixel 240 as (i) a step-like edge pixel 246, (ii) a line edge pixel 248, or (iii) a smooth pixel 242. In one embodiment, the control system 22 can use an edge detection algorithm to detect strong edges in the captured image 14. In this embodiment, the edge detection is performed at the pixel level and each of the pixels 240 of the captured image 14 is evaluated. There are a number of different, commonly known methods that can be used to identify the edge pixels 244 in a captured image. Most methods are based on the fact that the first derivative in the direction perpendicular to the edge direction is high at the location of the edge.

After the edge pixels 244 are identified with the edge detection algorithm, the smooth pixels 242 can be identified by subtracting the edge pixels 244 from the rest of the pixels in the captured image 14. Further, the control system 22 reviews the edge pixels 244 to determine which of the edge pixels 244 are classified as line edge pixels 248. The remaining edge pixels 244 in the captured image are classified as step-like edge pixels 246. Thus, if the edge pixel 244 is not classified as a line edge pixel 248, then the edge pixel 244 is classified as a step-like edge pixel 246. In certain embodiments, the line edge pixels 248 (which depict thin lines and other fine features of a different shape) are detected and handled differently from the other pixels during sharpening of the image.

One, non-exclusive method that can be used to identify edge pixels that are line edge pixels 248 includes evaluating all of the edge pixels 244 to identify pairs of edge pixels (e.g. opposite edges of the line) which are close to each other, that have gradients that point in the opposite direction from each other, and are approximately parallel. These pixels are classified as line edge pixels 248. Further, it should be noted that these close edge pixels, as well as all pixels between those pairs of edge pixels are considered a part of the line and are considered line edge pixels 248. Stated in another fashion, both the edge pixels forming the pair and all the pixels that are between them are part of the line and are considered line edge pixels 248.

As used herein, in alternative, non-exclusive embodiments, the phrase "close to each other" will depend upon the number of pixels in the captured image. For example, "close to each other" can mean adjacent to each other or within approximately 1, 2, or 3 pixels of each other. However, the meaning can be adjusted to suit the number of pixels in the image.

Referring back to FIG. 2, in column 13 (X13), the pixel in row 22 (Y22) and the pixel in row 24 (Y24) are at opposed edges of the rectangle, with opposite orientation and are close together (e.g. separated by only one pixel). In this example, the control system can classify pixels (X13, Y22) and (X13, Y24) as line edge pixels 248. It should be noted that in this example, if there were any pixels between the line pixels (X13, Y22) and (X13, Y24) in column 13, they would also be classified as line edge pixels 248. More specifically, in this example, pixel (X13, Y23) would also be classified as a line edge pixel 248.

In contrast, in column 13, (X13), the pixel in row 8 (Y8) and the pixel in row 16 (Y16) are at opposed edges of the oval 38 but are relatively far apart (e.g. eight pixels apart in a thirty pixel grid). In this example, the control system can classify pixels (X13, Y8) and (X13, Y16) as step-like edge pixels 246. The process classifying the edge pixels 244 is repeated until all of the pixels have been identified.

Figure 4:
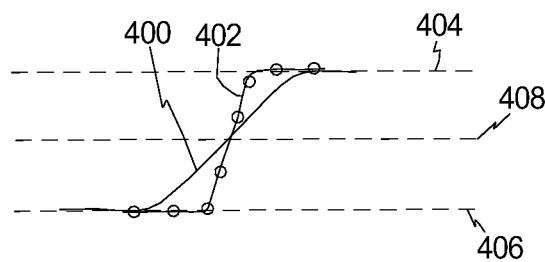
FIG. 4 is a graph that illustrates a portion of a first edge area of the captured image.

The sharpening of the step-like edge pixels utilizing tone mapping can better be understood with reference to FIG. 4. In this Figure, profile 400 represents a blurred individual step-like edge that is made up of a plurality of individual edge pixels. Because the edge is blurred, the slope of curve for profile 400 is not very steep.

Further, in FIG. 4, the profile 402 (line with circles) represents the sharpened edge profile that results from sharpening the pixels of profile 400 using the tone mapping provided herein. In this Figure, the highest selected high intensity value 404, the lowest selected low intensity value 406, and a middle intensity value 408 are also illustrated as dished lines. In this example, the sharpening algorithm utilizes a tone mapping step that reduces the width of edges in a digital image by adaptively increasing local contrast. More specifically, in this embodiment, the present invention (i) increases the intensity value of the pixels that have an intensity value above the middle intensity value 408, (ii) keeps the intensity value of the pixels that have an intensity value equal to the middle intensity value 408 the same, and (iii) decreases the intensity value of the pixels that have an intensity value below the middle intensity value 408. Stated in another fashion, with tone mapping, pixels having intensity values below the middle intensity value 408 are reduced and the pixels having intensity values above the middle intensity value 408 are increased. With this design, the present invention attempts to pivot the profile 400 about the middle intensity value 408 to increase the slope to provide the sharpened edge profile 402.

Referring back to FIG. 3, the step 302 of determining a selected high intensity value "H" and a selected low intensity value "L" for a pixel window of the selected pixel can be performed in a number of alternative fashions. In the captured image, each pixel has an original intensity value, and each pixel includes a plurality of neighboring pixels that are positioned in the predetermined pixel window. Further, for a selected pixel (i,j), the intensity values for each of the neighboring pixels are evaluated to determine the selected high intensity value (H(i,j)) and the selected low intensity value (L(i,j)) for the selected pixel (i,j).

For any selected pixel of the image, the selected high intensity value "H" and the selected low intensity value "L" are an approximation of the minimum and maximum brightness value in the neighborhood of the selected pixel. In one, non-exclusive embodiment, for each pixel, (i) the selected high intensity value "H" is equal to the maximum intensity of the neighboring pixels within the predetermined, local pixel window prior to sharpening, and (ii) the selected low intensity value "L" is equal to the minimum intensity of the neighboring pixels within the predetermined, local pixel window prior to sharpening. In this embodiment, before sharpening each pixel, the intensity values of the neighboring pixels in the pixel window for each pixel are evaluated. Next, the minimum intensity and maximum intensity within each pixel window is determined, because, in this example, the selected high intensity value "H" is equal to the maximum intensity in the pixel window, and the selected low intensity value "L" is equal to the minimum intensity in the pixel window. However, it should be noted that with this embodiment, there is a chance of error caused by noise and outliers in the respective pixel window.

In an alternative embodiment, instead of the maximum intensity value used as the selected high intensity value "H" and the minimum intensity value used as the selected low intensity value "L", for each selected pixel, several of the neighboring pixels that have the highest intensity values are reviewed to determine the selected high intensity value "H", and several of the neighboring pixels that have the lowest intensity values are reviewed to determine the selected low intensity value "L". Stated in another fashion, (i) the selected high intensity value "H" is determined by averaging several (e.g. 2, 3, 4, or 5) of the highest intensity values for the neighboring pixels, and (ii) the selected low intensity value "L" is determined by averaging several (e.g. 2, 3, 4 or 5) of the lowest intensity values for the neighboring pixels. This embodiment is more robust to noise and improves performance.

Figure 5A:
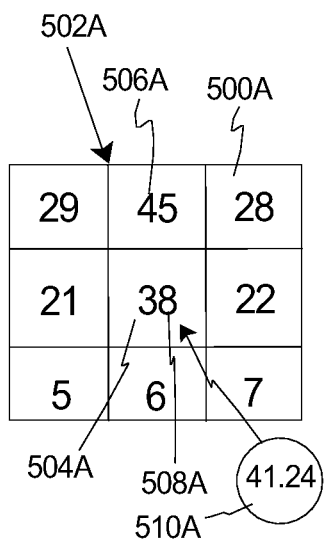
FIG. 5A illustrates a first pixel window having features of the present invention.
Figure 5B:
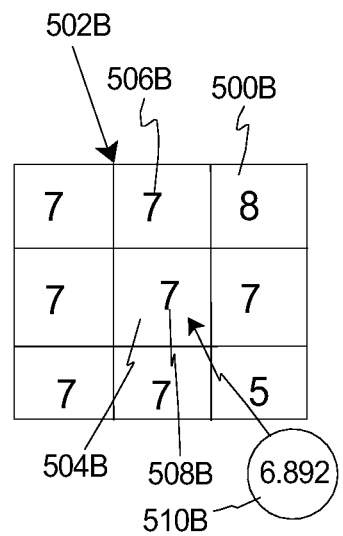
FIG. 5B illustrates a second pixel window having features of the present invention.

FIG. 5A illustrates a plurality of first neighboring pixels 500A that define a pre-determined first pixel window 502A that surrounds and encircles a first pixel 504A (at the center of the three by three grid). Somewhat similarly, FIG. 5B illustrates a plurality of second neighboring pixels 500B that define a pre-determined second pixel window 502B that surrounds and encircles a second pixel 504B (at the center of the three by three grid). FIGS. 5A and 5B also illustrate (i) an original intensity value 506A, 506B for each neighboring pixel 500A, 500B; (ii) an original intensity value 508A, 508B for the selected pixels 504A, 504B; and (iii) a sharpened, transformed intensity value 510A, 510B (illustrated within a circle) for the selected pixels 504A, 504B. Moreover, in these examples, it is provided that the first pixel 504A was classified as a step-like edge pixel 246, and the second pixel 504B was classified as a smooth pixel 242.

Figure 5C:
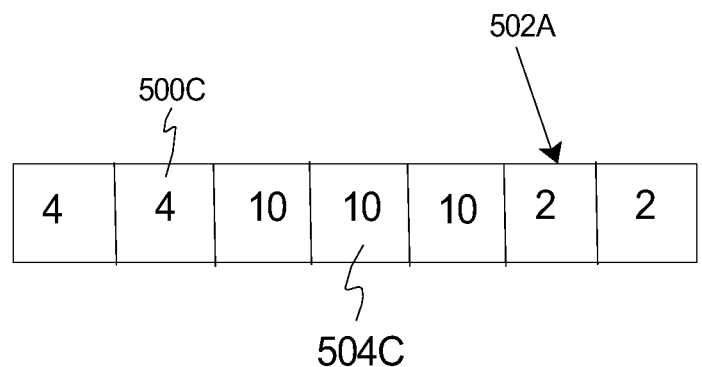
FIG. 5C illustrates a third pixel window having features of the present invention.

The size of the pixel windows 502A, 502B used can be varied. In FIGS. 5A and 5B, each pixel window 502A, 502B is square and includes eight neighboring pixels 500A, 500B. Alternatively, each square pixel window 502A, 502B can be larger than eight neighboring pixels 500A, 500B depending upon the image resolution. Still alternatively, each pixel window can have a shape that is different than square as illustrated in FIG. 5C and described below.

As one non-exclusive example, referring to FIG. 5A, for the first pixel 504A, (i) if the selected high intensity value "H" is determined by averaging three of the highest intensity values for the neighboring pixels 500A, the selected high intensity value "H" is equal to thirty-seven and one third ((45+38+29)/3); and (ii) if the selected low intensity value "L" is determined by averaging three of the lowest intensity values for the neighboring pixels 500A, the selected low intensity value "L" is equal to six ((7+6+5)/3).

In contrast, for the first pixel 504A (i) if the selected high intensity value "H" is determined only by the maximum intensity value for the neighboring pixels 500A, the selected high intensity value "H" is equal to forty-five; and (ii) if the selected low intensity value is determined only by the minimum intensity value for the neighboring pixels 500A, the selected low intensity value "L" is equal to five.

Next, referring to FIG. 5B, for the second pixel 504B, (i) if the selected high intensity value "H" is determined by averaging two of the highest intensity values for the neighboring pixels 500B, the selected high intensity value "H" is equal to seven and one-half ((8+7)/2); and (ii) if the selected low intensity value "L" is determined by averaging two of the lowest intensity values for the neighboring pixels 500B, the selected low intensity value "L" is equal to six ((7+5)/2).

In contrast, for the second pixel 504B, (i) if the selected high intensity value "H" is determined only by the maximum intensity value for the neighboring pixels 500B, the selected high intensity value "H" is equal to eight; and (ii) if the selected low intensity value "L" is determined only by the minimum intensity value for the neighboring pixels 500B, the selected low intensity value "L" is equal to five.

In another embodiment, an n-th highest intensity value can be used as the selected high intensity value "H", and an n-th lowest intensity value can be used as the selected low intensity value "L". Stated in another fashion, (i) the selected high intensity value "H" can be set as one of the second, the third, the fourth, or the fifth highest intensity value for the neighboring pixels, and (ii) the selected low intensity value "L" can be set as one of the second, the third, the fourth, or the fifth lowest intensity values for the neighboring pixels.

Referring back to FIG. 5A, as one non-exclusive example, for the first pixel 504A, (i) if the selected high intensity value "H" is determined by selecting the second highest intensity value for the neighboring pixels 500A, the selected high intensity value "H" is equal to thirty-eight; and (ii) if the selected low intensity value "L" is determined by selecting the second lowest intensity value for the neighboring pixels 500A, the selected low intensity value "L" is equal to six.

As another non-exclusive example, referring to FIG. 5B, for the second pixel 504B, (i) if the selected high intensity value "H" is determined by selecting the third highest intensity value for the neighboring pixels 500B, the selected high intensity value "H" is equal to seven; and (ii) if the selected low intensity value "L" is determined by selecting the third lowest intensity value for the neighboring pixels 500B, the selected low intensity value "L" is equal to seven.

FIG. 5C illustrates an alternatively shaped, third pixel window 502C having features of the present invention for a third pixel 504C. In this example, it is provided that the third pixel 504C was classified as a line edge pixel 248. Moreover, in this embodiment, for each edge pixel, a narrow pixel window 502C is utilized to determine the selected low intensity value (L(i,j)) and the selected high intensity value (H(i,j)). This shape reduces the computational cost because fewer pixels are being used in the pixel window. In FIG. 5C, the pixel window 502C has a length of seven pixels. Alternatively, the window 502C can have a length that is greater than or less than seven pixels.

As provided herein, the shape of window 502C can depends on the direction of edge. For example, the window 502C can extend in the direction approximately perpendicular to an edge (i.e., along the direction of gradient). For example, if the edge extends generally vertically, (i) the window 502C extends generally horizontally as illustrated in FIG. 5C, and (ii) three pixels to the left of the selected edge pixel, and three pixels to the right of the selected edge pixel cooperate with the selected edge pixel to define the pixel window 502C. Alternatively, for edges that are approximately horizontal, (i) the window extends generally vertically, and (ii) three pixels above the selected edge pixel and three pixels below the selected edge pixel cooperate with selected edge pixel to define the pixel window. Still alternatively, the pixel window can extend at an angle of 45 and 135 degree directions depending upon the orientation of the edge. It should be noted that the terms horizontal and vertical are used merely for reference with the illustration in FIG. 5C.

In FIG. 5C, for the third pixel 504C, (i) if the selected high intensity value "H" is determined only by the maximum intensity value for the neighboring pixels 500C, the selected high intensity value "H" is equal to ten; and (ii) if the selected low intensity value "L" is determined only by the minimum intensity value for the neighboring pixels 500C, the selected low intensity value "L" is equal to two.

Further, in certain embodiments, for pixels that are not edge pixels (e.g. smooth pixels 242 where there is no clear edge direction that could be used as described above), a "dummy" value can be created for the selected low intensity value (L(i,j)), and the selected high intensity value (H(i,j)). For example, a small constant can be selected, and (i) the selected low intensity value (L(i,j)) can be determined by subtracting the small constant from the original intensity value of the selected pixel, and (ii) the selected high intensity value (H(i,j)) can be determined by adding the small constant from the original intensity value of the selected pixel. As provided herein, these dummy values are good enough in these regions and it is computationally much faster.

Referring back to FIG. 3, at step 304, the control system normalizes the intensity value of each selected pixel to establish a normalized intensity value for each selected pixel. In one embodiment, the range of the selected low intensity value "L" and the selected high intensity value "H" are adjusted to a zero to one scale, and the corresponding normalized intensity value for the selected pixel is determined for this zero to one range. Stated in another fashion, for each selected pixel, its original intensity value is adjusted to a zero to one scale using its respective selected low intensity value "L" and its respective selected high intensity value "H" to provide the normalized intensity value for the selected pixel. Thus, range is normalized from [L,H] to [0,1]. Equation 1 below details the math required to provide the normalized intensity value for a selected pixel:

$$x(i,j)=(p_o(i,j)-L(i,j))/(H(i,j)-L(i,j)) \quad \text{Equation 1}$$

In the Equations provided herein, (i) $x(i,j)$ represents the normalized intensity value for the selected pixel $(i,j)$; (ii) $p_o(i,j)$ represents the original intensity value at the selected pixel $(i,j)$; (iii) $L(i,j)$ represents the selected low intensity value for the pixels in the window that surround selected pixel $(i,j)$; and (iv) $H(i,j)$ represents the selected high intensity value for the pixels in the window that surround selected pixel $(i,j)$.

The calculation of the normalized intensity value can be better understood with reference back to FIGS. 5A-5C. For example, (i) the normalized intensity value for the first selected pixel is equal to 0.825 (0.825=(38−5)/(45−5)); (ii) the normalized intensity value for the second selected pixel is equal to 0.333 (0.333=(7−6)/(8−5)); and (iii) the normalized intensity value for the third selected pixel is equal to 1 (1=(10−2)/(10−2)). In these examples, for simplicity, the selected high intensity value "H" is equal to the maximum intensity value in the respective pixel window, and the selected low intensity value "L" is equal to the minimum intensity value in the respective pixel window.

Next, referring back to FIG. 3, at step 306, the control system determines an adjusted normalized intensity value for the normalized intensity value using a contrast correction function. In one embodiment, as provided herein, the contrast correction function $g_a(x)$, maps [0,1] to [0,1], but has a different slope in the central region depending on the value of parameter a. One example of the contrast correction function $g_a(x)$ is expressed as follows:

$$g_a(x)=2^{a-1}x^a \text{ if } 0 \leq x \leq \tfrac{1}{2} \quad \text{Equation 2}$$

or $$g_a(x)=1-2^{a-1}(1-x)^a \text{ if } \tfrac{1}{2} \leq x \leq 1 \quad \text{Equation 3}.$$

In the Equations provided herein, (i) "$g_a(x)$" represents the adjusted normalized intensity value that corresponds to the normalized intensity value for the selected pixel; (ii) "x" represents the normalized intensity value for the selected pixel; and (iii) "a" represents a parameter that controls the steepness of the curve in the middle of the slope. With this design, Equation 2 is used if the normalized intensity value for the selected pixel is less than or equal to one-half, and Equation 3 is used if the normalized intensity value for the selected pixel is greater than or equal to one-half.

It should be noted that if n-th largest/smallest value or the average of n largest/smallest values is used to compute L and H, x may turn out to be smaller than zero or larger than one. Then it is a question what the transformed normalized intensity value should be. The possibilities include, for example, leaving the value unchanged ($g_a(x)=x$) or clipping the value ($g_a(x)=0$ if $x<0$, $g_a(x)=1$ if $x>1$).

Further, it should be noted that slope at the middle of the curve is equal to parameter "a" ($g'_a(\tfrac{1}{2})=a$). Thus, parameter "a" controls the steepness of the contrast correction curve. By changing the value of parameter a, it is possible to achieve a weaker or stronger sharpening effect.

In certain embodiments, for example, the parameter "a" can have a value of between approximately 1 and 1.6. As alternative non-exclusive examples, the parameter "a" can have a value of 1, 1.1, 1.2, 1.3, 1.4, 1.5, or 1.6. Because the slope in the middle is equal to the parameter "a", in these non-exclusive examples, the contrast correction function can have a slope in the middle of approximately 1, 1.1, 1.2, 1.3, 1.4, 1.5, or 1.6. It should be noted that the present invention teaches that slopes of approximately 2 in the middle can tend to cause a posterized and undesirable result in the adjusted image.

As provided herein, it is either possible to choose the same value of parameter "a" for each pixel in the entire image, depending on the amount of sharpening that the given image needs in general, or it is possible to set a different value of parameter "a" for each individual pixel, depending on how much sharpening is desirable in that particular location. Thus, by varying the value of parameter "a", it is possible, for example, to sharpen differently areas that contain edges and texture, than areas that are smooth (without edges and texture).

In one non-exclusive example, (i) step-like edge pixels 246 (illustrated in FIG. 2) can be sharpened with a first contrast correction function having a first value for parameter "a"; (ii) line edge pixels 248 (illustrated in FIG. 2) can be sharpened with a second contrast correction function having a second value for parameter "a" that is different than the first value; and (iii) smooth pixels 242 (illustrated in FIG. 2) can be sharpened with a third contrast correction function having a third value for parameter "a" that is different than the first value and the second value. As a non-exclusive example, the first value of "a" can be equal to 1.6, the second value of "a" can be equal to 1.4, and the third value of "a" can be equal to 1.

Sharpening in smooth areas containing no significant texture mostly only magnifies noise present in the captured image. In certain embodiments, it can be desirable to reduce the amount of sharpening applied to the pixels in the smooth areas. It is, however, in certain embodiments, not desirable to reduce the amount of sharpening applied to areas containing edges and texture, because this would lead to a less sharp image. In other words, it may be desirable to choose a higher value of parameter "a" for those pixels that are in areas where edges and texture are present, and a smaller value of parameter "a" for the pixels in smooth areas with no significant edges or texture. This can produce a more pleasing image that is sharp but contains less noise than an image for which the values of parameter "a" were not chosen differently for different pixels.

Further, in certain embodiments, it can be desirable to sharpen step-like edge pixels 246 differently from the line edge pixels 248. For example, it may be desirable to choose a higher value of parameter "a" for the step-like edge pixels 246 than the line edge pixels 248. In another embodiment, it may be desirable to not sharpen the line edge pixels 248 using tone mapping, and instead sharpen the line edge pixels 248 with another method, such as a sharpening algorithm that is commonly referred to as unsharp mask. In this type of operation, an approximation of the blurred portion of the edge is extracted using a low-pass filter. Subsequently, the original and blurred versions of the edge are compared to obtain the high frequency signal, which is subsequently multiplied by a gain factor that is greater than one, and added back to the original edge to generate the resulting sharpened edge profile.

The calculation of the normalized intensity value using Equations 2 and 3 can be better understood with reference the calculations provided above for the first, the second and the third selected pixels. As provided above, the normalized intensity value for the first selected pixel is equal to 0.825. Accordingly, because 0.825 is greater than one half, Equation 3 is used to sharpen the first selected pixel. In this example, if the value of parameter "a" is set to 1.6 (e.g. because it is a step-like edge pixel), the adjusted normalized intensity value for the first selected pixel is equal to 0.906 ($0.906=1-2^{1.6-1}(1-0.825)^{1.6}$).

Further, as provided above, the normalized intensity value for the second selected pixel is equal to 0.333. Accordingly, because 0.333 is less than one half, Equation 2 is used to sharpen the second selected pixel. In this example, if the value of parameter "a" is set to 1.2 (e.g. because it is a smooth pixel), the adjusted normalized intensity value for the second selected pixel is equal to 0.614 ($0.614=2^{1.2}\times 0.333^{1.2}$).

Moreover, as provided above, the normalized intensity value for the third selected pixel is equal to 1. Accordingly, because 1 is greater than one half, Equation 3 is used to sharpen the third selected pixel. In this example, if the value of parameter "a" is set to 1.4 (e.g. because it is a line edge pixel), the adjusted normalized intensity value for the third selected pixel is equal to one ($1=1-2^{1.4-1}(1-1)^{1.4}$).

Figures 6, 7:
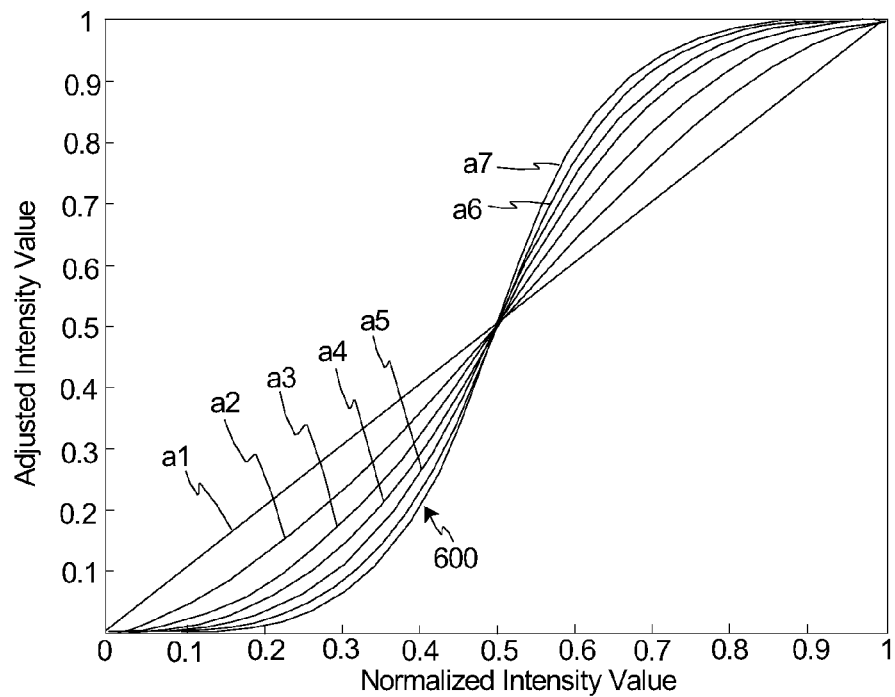
FIG. 6 is a graph that illustrates a plurality of alternative contrast curves and the relationship between normalized intensity values and adjusted normalized intensity values for these curves.
FIG. 7 is a look-up table that illustrates the relationship between normalized intensity values and adjusted normalized intensity values for a plurality of different contrast curve functions.

As illustrated in FIG. 6, a graph can be generated that illustrates a plurality of alternative contrast curves 600 that represent the relationship between the normalized intensity values and the adjusted normalized intensity values for a plurality of alternative values of the parameter "a" can be generated. In FIG. 6, (i) contrast curve labeled a1 has a parameter "a" value of a1 and a slope at the middle (at 0.5) of a1; (ii) contrast curve labeled a2 has a parameter "a" value of a2 and a slope at the middle (at 0.5) of a2; (iii) contrast curve labeled a3 has a parameter "a" value of a3 and a slope at the middle (at 0.5) of a3; (iv) contrast curve labeled a4 has a parameter "a" value of a4 and a slope at the middle (at 0.5) of a4; (v) contrast curve labeled a5 has a parameter "a" value of a5 and a slope at the middle (at 0.5) of a5; (vi) contrast curve labeled a6 has a parameter "a" value of a6 and a slope at the middle (at 0.5) of a6; and (vii) contrast curve labeled a7 has a parameter "a" value of a7 and a slope at the middle (at 0.5) of a7. In one non-exclusive embodiment, a1 has a value of approximately 1; a2 has a value of approximately 1.1; a3 has a value of approximately 1.2; a4 has a value of approximately 1.3; a5 has a value of approximately 1.4; a6 has a value of approximately 1.5; and a7 has a value of approximately 1.6. Stated in another fashion, FIG. 6 is graph that shows the function $g_a(x)$ for different values of $a \geq 1$.

In this design, the adjusted normalized intensity value for each pixel can be determined with reference to the graph in FIG. 6 by comparing the normalized intensity value to the desired contrast curve.

It should be noted that in FIG. 6, for contrast curves a2-a7, (i) for normalized intensity values below 0.5, the corresponding normalized intensity value is greater than the corresponding adjusted normalized intensity value; and (ii) for normalized intensity values above 0.5, the corresponding normalized intensity value is less than the corresponding adjusted normalized intensity value.

Still alternatively, as illustrated in FIG. 7, a look-up table can be generated that contains the relationship between the normalized intensity values and the adjusted normalized intensity values for a plurality of (e.g. three) alternative values of the parameter "a". More specifically, in the simplified look-up table of FIG. 7, the normalized intensity values of 0.2, 0.4, 0.6, and 0.8 are represented, along with their corresponding adjusted normalized intensity values for three alternative parameter "a" values (namely a=1.2, a=1.4, and a=1.6). It should be noted that the look-up table will likely include many more intensity values and many more alternative parameter "a" values than illustrated in FIG. 7.

With this design, for each pixel, the adjusted normalized intensity value can be looked-up by the respective normalized intensity value. Further, for normalized intensity values not represented in the look-up table, the respective adjusted normalized intensity value can be determined by linear interpolation.

Next, referring back to FIG. 3, at step 308, the control system scales the adjusted normalized intensity value to get a transformed intensity value. Stated in another fashion, the range is transformed back from zero to one scale [0,1] to the selected high and low intensity scale [L,H]. Equation 4 below details the math required to provide the transform the adjusted normalized intensity value for the selected pixel.

$$P_{new}=L+g_a(x)(H-L) \quad \text{Equation 4}$$

In this equation, $P_{new}$ represents the transformed intensity value for the selected pixel. This transformed intensity value for each pixel is subsequently used to generate the adjusted image.

The calculation of the normalized intensity value can be better understood with reference the first, second, and third pixels. For example, (i) the transformed intensity value for the first selected pixel is equal to 41.24 (41.24=5+0.906(45−5)); (ii) the transformed intensity value for the second selected pixel is equal to 6.892 (6.892=5+0.614(8−5)); and (iii) the transformed intensity value for the third selected pixel is equal to ten (10=2+1(10−2)). In these examples, for simplicity, the selected high intensity value "H" is equal to the maximum intensity value in the respective pixel window, and the selected low intensity value "L" is equal to the minimum intensity value in the respective pixel window.

In the foregoing embodiments, the pixel intensity is referred to as if it has a single value. This is true in the case of gray scale images. However, in color images, the intensity of each pixel is actually a combination of individual color intensities. For example, when a RGB color space is used to characterize the pixel color, there is a red color channel intensity, green color channel intensity and blue color channel intensity. In certain embodiments, when a color image is sharpened, the process is repeated for each color channel of each edge pixel. Alternatively, the RGB color image can be transformed to a YCbCr color space, and only the Y channel (which represents image luminance) can be sharpened. This takes advantage of the fact that the human vision system is more sensitive to sharpness of the luminance channel (Y) than the sharpness of the chrominance channels (CbCr). Other embodiments could sharpen the chrominance channels Cb and Cr, perhaps with different parameters as Y, or an altogether different color space could be used in which one or more channels would get sharpened.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for sharpening a captured image having a plurality of pixels using a processor to perform the following steps:

identifying a first pixel having a first intensity value in the captured image, the first pixel including a plurality of first neighboring pixels that are positioned in a predetermined first pixel window;

selecting a first selected high intensity value for the first pixel window;

selecting a first selected low intensity value for the first pixel window;

normalizing the first intensity value to establish a first normalized intensity value using the selected high intensity value and the selected low intensity value;

selecting between one of a first contrast correction function providing a first level of sharpening and a second contrast correction function providing a second level of sharpening that is different from the first level of sharpening, the first contrast correction function having a first slope in a middle and the second contrast correction function having a second slope in a middle that is different than the first slope;

determining a first adjusted normalized intensity value for the first normalized intensity value using the selected contrast correction function; and scaling the first adjusted normalized intensity value to get a first transformed intensity value.

2. The method of claim 1 wherein each contrast correction function has a slope in the middle that is less than two.

3. The method of claim 1 wherein each contrast correction function has a slope in the middle that is between approximately 1 and 1.6.

4. The method of claim 1 further comprising the step of providing the adjusted image using the first transformed intensity value.

5. The method of claim 1 further comprising the steps of (i) identifying a second pixel having a second intensity value in the captured image, the second pixel including a plurality of second neighboring pixels that are positioned in a predetermined second pixel window; (ii) selecting a second selected high intensity value for the second pixel window; (iii) selecting a second selected low intensity value for the second pixel window; (iv) normalizing the second intensity value to establish a second normalized intensity value; (v) selecting between the first contrast correction function and the second contrast correction function; (vi) determining a second adjusted normalized intensity value for the second normalized intensity value using a second selected contrast correction function; and (vii) scaling the second adjusted normalized intensity value to get a second transformed intensity value.

6. The method of claim 1 further comprising the step of classifying the pixels in the captured image as either a step-like edge pixel or a non-step like edge pixel; and wherein the step of selecting between one of a first contrast correction function and a second contrast correction function includes selecting the first contrast correction function if the selected pixel is classified as a step-like edge pixel and selecting the second contrast correction function if the selected pixel is classified as a non-step like edge pixel.

7. A method for sharpening a captured image having a plurality of pixels using a processor to perform the following steps:

identifying a plurality of edge pixels in the captured image;

reviewing the plurality of edge pixels to identify one or more line edge pixels in the captured image, and one or more step-like edge pixels in the captured image;

selecting one of the step-like edge pixels;

normalizing an intensity value for the selected step-like edge pixel;

determining an adjusted normalized intensity value for the selected step-like edge pixel using the normalized intensity value for the selected step-like edge pixel and a first contrast correction function having a first slope;

selecting one of the line edge pixels;

normalizing an intensity value for the selected line edge pixel; and determining an adjusted normalized intensity value for the selected line edge pixel using the normalized intensity value for the selected line edge pixel and a second contrast correction function having a second slope that is different than the first slope.

8. The method of claim 7 wherein the first slope and the second slope are less two in the middle.

9. The method of claim 7 wherein the first slope and the second slope are between approximately 1 and 1.6 in the middle.

10. The method of claim 7 wherein the first slope is steeper than the second slope in the middle.

11. The method of claim 7 further comprising the steps of (i) identifying a plurality of smooth pixels in the captured image; (ii) selecting one of the smooth edge pixels; (iii) normalizing an intensity value for the selected smooth edge pixel; and (iv) determining an adjusted normalized intensity value for the selected smooth pixel using the normalized intensity value for the selected smooth pixel and a third contrast correction function having a third slope that is different than the first slope and the second slope.

12. The method of claim 7 further comprising the steps of (i) identifying a plurality of smooth pixels in the captured image; (ii) selecting one of the smooth edge pixels; (iii) normalizing an intensity value for the selected smooth edge pixel; and (iv) determining an adjusted normalized intensity value for the selected smooth pixel using the normalized intensity value for the selected smooth pixel and the second contrast correction function.

13. A method for sharpening a captured image using a processor to perform the following steps:

processing a first pixel in the captured image that includes a plurality of first neighboring pixels that are positioned in a predetermined first pixel window by (i) identifying a first intensity value for the first pixel; (ii) selecting a first selected high intensity value for the first pixel window; (iii) selecting a first selected low intensity value for the first pixel window; (iv) normalizing the first intensity value to establish a first normalized intensity value using the selected high intensity value and the selected low intensity value; (v) determining a first adjusted normalized intensity value for the first normalized intensity value using a first contrast correction function having a first slope in a middle; and (vi) scaling the first adjusted normalized intensity value to get a first transformed intensity value; and processing a second pixel in the captured image that includes a plurality of second neighboring pixels that are positioned in a predetermined second pixel window by (i) identifying a second intensity value for the second pixel; (ii) selecting a second selected high intensity value for the second pixel window; (iii) selecting a second selected low intensity value for the second pixel window; (iv) normalizing the second intensity value to establish a second normalized intensity value; (v) determining a second adjusted normalized intensity value for the second normalized intensity value using a second contrast correction function having a second slope in a middle that is different than the first slope; and (vi) scaling the second adjusted normalized intensity value to get a second transformed intensity value.

14. The method of claim 13 wherein the first slope in the middle is between approximately 1 and 1.6, and wherein the second slope in the middle is between approximately 1 and 1.6.

15. The method of claim 13 further comprising the step of providing the adjusted image using the first transformed intensity value and the second transformed intensity value.

16. The method of claim 13 further comprising the step of evaluating the captured image to identify step-like edge pixels and line edge pixels; wherein the step-like edge pixels are processed similar to the first pixel; and wherein the line edge pixels are processed similar to the second pixel.

17. The method of claim 13 further comprising the step of processing a third pixel in the captured image that includes a plurality of third neighboring pixels that are positioned in a predetermined third pixel window by (i) identifying a third intensity value for the third pixel; (ii) selecting a third selected high intensity value for the third pixel window; (iii) selecting a third selected low intensity value for the third pixel window; (iv) normalizing the third intensity value to establish a third normalized intensity value; (v) determining a third adjusted normalized intensity value for the third normalized intensity value using a third contrast correction function having a third slope in a middle that is different than the first slope and the second slope; and (vi) scaling the third adjusted normalized intensity value to get a third transformed intensity value.

18. The method of claim 17 further comprising the step of evaluating the captured image to identify step-like edge pixels, line edge pixels, and smooth pixels; wherein the step-like edge pixels are processed similar to the first pixel; the line edge pixels are processed similar to the second pixel; and the smooth pixels are processed similar to the third pixel.

* * * * *